T. NAGEL.
PIPE CLAMP FOR GROUND CONTACTS.
APPLICATION FILED DEC. 31, 1908.
921,145. Patented May 11, 1909.
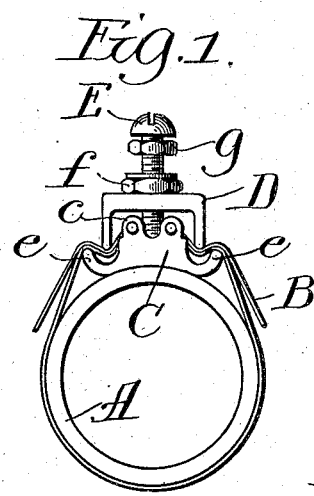
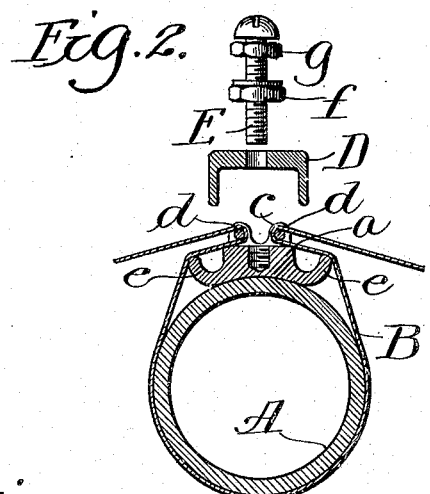
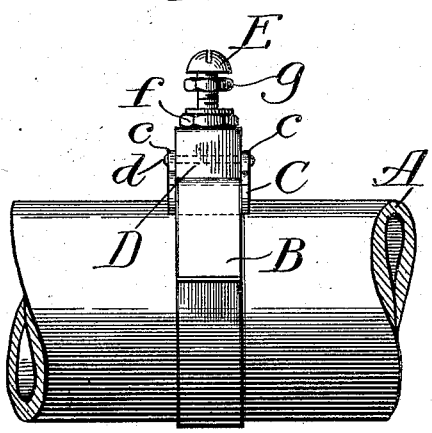
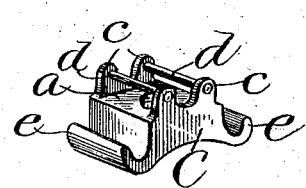
Witnesses:
Inventor
Theodore Nagel,
by Frank D. Thomason
Atty

UNITED STATES PATENT OFFICE.

THEODORE NAGEL, OF CHICAGO, ILLINOIS.

PIPE-CLAMP FOR GROUND-CONTACTS.

No. 921,145.  Specification of Letters Patent.  Patented May 11, 1909.

Application filed December 31, 1908. Serial No. 470,224.

*To all whom it may concern:*

Be it known that I, THEODORE NAGEL, a citizen of the United States, and a resident of Chicago, in the county of Cook and State of Illinois, have invented certain new and useful Improvements in Pipe-Clamps for Ground-Contacts, of which the following is a clear, full, and exact description.

My invention relates to ground contacts for electric circuits, particularly that type of contacts that are attached to metallic pipes.

The object of my invention is to provide a simple contrivance which can be easily and quickly attached to pipes and clamped securely thereon by taking up any slack of the band of the same that may remain after securing the ends thereof with the fingers, so as to absolutely prevent any independent movement of said contrivance either lengthwise or transversely upon the pipe. This I accomplish by the means hereinafter described and as particularly pointed out in the claims.

In the drawings:—Figure 1 is a side view of my invention showing it applied to a pipe. Fig. 2 is a similar view showing the saddle in section. Fig. 3 is an end view of the same. Fig. 4 is a perspective view of the saddle. Fig. 5 is a perspective view of the clamping-plate.

Referring to the drawings A represents the pipe to which my invention is applied; B the brass-band or strap used in connection therewith; C the saddle in which the ends of the strap B are secured; D the inverted channel-shaped clamp, and E the binding-post.

The saddle C consists of a metallic block, the length of which is transverse to the pipe and the surface of which, coming in contact with said pipe, is concaved so as to accommodate the curvature of the same and the ends thereof bear against said pipe. The ends $e$ of the saddle are curved or flanged upward, and midway between its ends it is provided with a flattened surface or plateau $a$, the center of which is tapped to receive the screw-threaded binding-post E. Near the end of this plateau the sides of the saddle are provided with upwardly projecting lugs $c$, $c$, $c$, $c$, that are connected by transverse bars $d$, $d$. When it is desired to attach the ends of band or strap B to the saddle, one end of said strap is passed under one of said bars a sufficient distance and then bent back upon itself, preferably, over the adjacent end of the saddle, and then said strap is passed around the pipe and its other end is passed under the other bar $d$, and drawn as tightly as possible with the fingers, or, with pincers, if desired, and then bent back upon itself, in the same manner as the first mentioned end. The channel-shaped clamp D is then inverted and placed upon the saddle so that its flanged ends will come in contact with and rest upon the ends of the band at points between the flanged ends of the saddle and said plateau, and then the binding-post is screwed into the central opening in the plateau $a$ until the flanged ends of the clamping-plate bend the end portions of the strap between the flanged ends of the saddle and said rims, inward toward the pipe sufficient to take up any slack the strap may possess, and make it clamp the pipe so tightly that it will be impossible for it to move either lengthwise upon the pipe or in a circumferential direction thereon.

The binding-post consists of a screw that has a set-nut $f$ thereon, by means of which the extent of its passage through the clamping-plate is determined, and the extent of the flanges of the clamp can bend the strap when the latter is being tightened, as shown in Fig. 1 of the drawings. The binding-post also has another nut $g$ thereon for facilitating the securing of the wire thereto, the operation of which is well understood.

What I claim as new is:—

1. A clamp for ground contacts for electric circuits comprising a saddle having transverse channels therein, a band or strap the ends of which pass over said channels and are suitably secured in said saddle, a clamp adapted to bear upon the portions of said strap bridging said channels, and a binding-post for securing said clamp to said saddle.

2. A clamp for ground contacts for electric circuits comprising a saddle having a transverse channel on each side of the center of length thereof, a band or strap the ends of which pass over said channels and are suitably secured in said saddle, a clamp adapted to bear upon the portions of said strap bridging said channels, and a binding-post for securing said clamp to said saddle.

3. A clamp for ground contacts for electric circuits comprising a saddle having transverse channels therein, a band or strap the ends of which pass over said channels and are suitably secured in said saddle, a channel-shaped clamp adapted to bear upon the portions of said strap bridging said channels, and a binding-post for securing said clamp to said saddle.

4. A clamp for ground contacts for electric circuits comprising a saddle having a transverse channel on each side of the center of length thereof, a band or strap the ends of which pass over said channels and are suitably secured in said saddle, a channel-shaped clamp adapted to bear upon the portions of said strap bridging said channels, and a binding-post for securing said clamp to said saddle.

5. A clamp for ground contacts for electric circuits comprising a band or strap, a saddle having a transverse channel therein, and having a transverse attaching device around which one end of said strap passes after bridging one of said channels, a clamp adapted to bear upon the portions of said strap bridging said channels, and a binding post for securing said clamp to said saddle.

6. A clamp for ground contacts for electric circuits comprising a band or strap, a saddle having a transverse channel therein, and having a transverse bar around which one end of said strap passes after bridging one of said channels, a clamp adapted to bear upon the portions of said strap bridging said channels, and a binding-post for securing said clamp to said saddle.

7. A clamp for ground contacts for electric circuits comprising a band or strap, a saddle having a transverse channel on each side of the center of length thereof, and having a transverse device between each of said transverse channels and said center around which the ends of said strap passes, a clamp adapted to bear upon the portions of the strap bridging said channels, and a binding-post for securing said clamp to said saddle.

8. A clamp for ground contacts for electric circuits comprising a band or strap, a saddle having a flat central portion and lugs rising from the four corners thereof, and having transverse channels therein at the ends of said flat portion, transverse bars connecting said lugs, around which the ends of said strap are bent back upon the body thereof, a clamp adapted to bear upon said portions of said strap bridging said channel, and a binding-post that secures said clamp to said saddle.

9. A clamp for ground contacts for electric circuits comprising a band or strap, a saddle having a transverse channel therein, and having a transverse attaching device around which one end of said strap passes after bridging one of said channels, a channel-shaped clamp adapted to bear upon the portions of said strap bridging said channels, and a binding-post for securing said clamp to said saddle.

10. A clamp for ground contacts for electric circuits comprising a band or strap, a saddle having a transverse channel on each side of the center of length thereof and having a transverse device between each of said transverse channels and said center around which the ends of said strap passes, a channel-shaped clamp adapted to bear upon the portions of the strap bridging said channels, and a binding-post for securing said clamp to said saddle.

11. A clamp for ground contacts for electric circuits comprising a band or strap, a saddle having a flat central portion and lugs rising from the four corners thereof, and having transverse channels therein at the ends of said flat portion, transverse bars connecting said lugs, around which the ends of said strap are bent back upon the body thereof, a channel-shaped clamp adapted to bear upon said portions of said strap bridging said channels, and a binding-post that secures said clamp to said saddle.

12. A clamp for ground contacts for electric circuits comprising a strap or band, a saddle in which ends of said strap are removably secured, a clamp adapted to engage the end portions of said strap, and a binding-post for securing the clamp to said saddle.

13. A clamp for ground contacts for electric circuits comprising a strap or band, a saddle in which ends of said strap are removably secured, a clamp adapted to engage the end portions of said strap, and take up the slack in the same, and a binding-post for securing the clamp to said saddle.

14. A clamp for ground contacts for electric circuits comprising a strap or band, a saddle in which ends of said strap are removably secured, having depressions therein, a clamp adapted to engage the end portions of said strap, and a binding-post for securing the clamp to said saddle.

In testimony whereof I have hereunto set my hand and seal this 22d of December, A. D. 1908.

THEODORE NAGEL. [L. S.]

Witnesses:
 FRANK D. THOMASON,
 M. E. MARTIN.